(12) United States Patent
Spiess et al.

(10) Patent No.: US 7,771,333 B2
(45) Date of Patent: Aug. 10, 2010

(54) CONVEYOR ROLLER SYSTEM

(75) Inventors: Bryan Spiess, St. Francis, MN (US); John Dallum, Ramsey, MN (US)

(73) Assignee: Advanced Aircraft Roller Systems, Inc., St. Francis, MN (US)

( * ) Notice: Subject to any disclaimer, the term of this patent is extended or adjusted under 35 U.S.C. 154(b) by 928 days.

(21) Appl. No.: 10/068,243

(22) Filed: Feb. 6, 2002

(65) Prior Publication Data

US 2002/0115547 A1   Aug. 22, 2002

Related U.S. Application Data

(60) Provisional application No. 60/266,752, filed on Feb. 6, 2001.

(51) Int. Cl.
F16C 13/00 (2006.01)
B65G 13/00 (2006.01)

(52) U.S. Cl. .................... 492/59; 492/16; 492/56; 492/57; 193/37; 198/780

(58) Field of Classification Search .............. 492/13, 492/14, 19, 16, 45, 47, 56, 59, 57; 198/843, 198/780; 193/37; 29/895.2, 895.211, 895.22, 29/895.23
See application file for complete search history.

(56) References Cited

U.S. PATENT DOCUMENTS

| | | | | | |
|---|---|---|---|---|---|
| 736,027 | A | * | 8/1903 | Sauer | 492/13 |
| 1,305,330 | A | * | 6/1919 | Wolever et al. | 492/31 |
| 2,258,268 | A | * | 10/1941 | Sparks et al. | 524/322 |
| 2,572,276 | A | | 10/1951 | Moe | |
| 2,672,306 | A | * | 3/1954 | Doolittle et al. | 244/63 |
| 2,886,156 | A | * | 5/1959 | Halbron | 193/37 |
| 3,293,728 | A | * | 12/1966 | Hill | 492/59 |
| 3,711,912 | A | * | 1/1973 | Teske et al. | 198/843 |
| 3,797,082 | A | | 3/1974 | Brunes | |
| 3,913,729 | A | * | 10/1975 | Andrews | 198/807 |
| 4,168,771 | A | | 9/1979 | Krivec | |
| 4,203,509 | A | * | 5/1980 | Thompson et al. | 193/37 |
| 4,213,523 | A | * | 7/1980 | Frost et al. | 193/37 |
| 4,440,295 | A | * | 4/1984 | Blackwood-Murray et al. | 198/843 |

(Continued)

FOREIGN PATENT DOCUMENTS

BE    671.076    11/1965

(Continued)

*Primary Examiner*—David P Bryant
*Assistant Examiner*—Sarang Afzali
(74) *Attorney, Agent, or Firm*—Merchant & Gould P.C.

(57) ABSTRACT

An aircraft conveyor system comprising an aircraft including an aircraft cargo storage bay; and a roller mounted within the aircraft cargo storage bay, the roller including a one-piece integral body having a cylindrical shape, the entirety of the body being made solely out of a single piece of polymeric material, said body having a length extending from a first outermost end to a second outermost end and a diameter and a first and second exterior shoulders at the ends, said body including an aperture extending longitudinally along and through the center of said body from the first outermost end to the second outermost end, the aperture sized to rotatably receive an axle therethrough, the axle being for mounting the roller within the aircraft cargo storage bay, wherein the roller has a burn rate of less than 4.0 inches per minute.

11 Claims, 3 Drawing Sheets

U.S. PATENT DOCUMENTS

| | | | |
|---|---|---|---|
| 4,681,203 A * | 7/1987 | Kornylak | 193/35 R |
| 4,766,996 A * | 8/1988 | Gibson | 198/780 |
| 4,790,421 A * | 12/1988 | Gorges | 193/37 |
| 4,838,986 A * | 6/1989 | Rhoades et al. | 492/13 |
| 5,217,099 A * | 6/1993 | Marcus et al. | 193/37 |
| 5,542,900 A * | 8/1996 | Burke | 492/16 |
| 5,655,642 A * | 8/1997 | Lawrence et al. | 193/37 |
| 5,806,131 A * | 9/1998 | Tennant | 492/13 |
| 5,893,821 A * | 4/1999 | Ando et al. | 492/59 |
| 6,044,963 A * | 4/2000 | Lerch et al. | 492/56 |
| 6,113,059 A * | 9/2000 | Couillard | 248/694 |
| 6,354,424 B1 * | 3/2002 | Rowles | 193/35 A |
| 6,516,933 B1 * | 2/2003 | Ledingham | 193/35 F |

FOREIGN PATENT DOCUMENTS

| | | |
|---|---|---|
| DE | 295 05 461.1 | 7/1995 |
| EP | 0683438 A2 | 11/1995 |
| EP | 0683438 A3 | 11/1995 |
| GB | 2124333 A | 2/1984 |
| JP | 2000136287 A | 5/2000 |

\* cited by examiner

CONVEYOR ROLLER SYSTEM

The present invention relates to rollers for conveyor belts and more specifically to rollers that provide means for immediate visual inspection, which claims priority from a provisional patent application Ser. No. 60/266,752, filed Feb. 6, 2001 is entitled Conveyer Roller.

Conveyors are used in various systems, including in manufacturing plants, loading and unloading areas such as shipping and receiving docks and cargo haulers, such as aircraft. While these conveyors may have an extending belt which provides the carrying surface, many do not. Conveyors for large or packaged goods often do not have large belt and merely rely on a series of rollers to carry the product along a production line.

Manufacture of prior rollers involved assembling various parts including bearing, a housing, end caps and other components. Manufacture of a variety of components and later assemblage of the same is costly in time and money. Moreover, the complexity of the process has led to poorly constructed rollers.

The rollers become damaged internally and externally over the course of their usable life. Prior rollers were manufactured of metal and provided no mechanism for viewing the internal components of the roller to determine if the wear had become too extensive for proper operation. Inspection of these rollers would entail disassembly of the rollers, inspection of the interior and reassembly if appropriate. The time and expense involved in this process has led most users to simply discard rollers after a period of time regardless of the condition of the roller. While the periodic replacement of rollers obviates the inspection costs and repair problems, it is costly to replace good rollers.

In the particular application intended by the invention, the placement of the roller is in the cargo bays of a cargo aircraft to allow the loading, unloading, and placement of cargo packages within the aircraft where the rollers in the cargo bay perform the dual function of allowing the cargo containers to be rolled into place and supporting the cargo during flight. The aircraft application presents the additional need that the rollers each be relatively lightweight. The prior art makes a conventional roller lightweight by constructing the roller as a hollow roller. While using hollow rollers helps with the weight problems, it creates the additionally problem that the rollers may be dented or otherwise deformed when a user is rough in loading the cargo.

When a product moves along the conveyor system, all too frequently, the product will get stuck, requiring operator intervention to return the conveyer system to its operation of moving product. Frequently and operator can manually move the product into line and return the conveyer to operation, however, that is not always the case and sometimes an operator will resort to tools to move the product so that the conveyer can operate. When large containers of products are on the conveyer and not moving, frequently an operator will use a pry bar to urge the product into the proper location to move the product. Unfortunately when pry bars are used, the bar is commonly placed between the rollers to lever the product along, the results are frequently denting of the roller housing or otherwise damaging the roller. This problem is exacerbated by the lack of internal support and non-resilient materials being used to construct the prior rollers.

What is needed is a one piece roller, that includes a mechanism for viewing the structure of the roller for defects and need for repair. Further, the roller should provide support to the housing and the housing should be formed of a resilient material for long life with minimal wear. Additional desired features include corrosion resistance, low weight, and ease of cleaning.

SUMMARY OF THE INVENTION

The present invention is a roller for a conveyor system with substantial new, useful and non-obvious features, which are needed in the marketplace. In particular the roller is a generally integral single piece component formed of suitable polymer. Preferably the polymer is translucent or transparent to allow visual inspection of the entire roller without disassembly of the conveyor system.

Similar to a conventional roller, the roller of the present invention is a cylindrical tube having a central aperture for mounting on a conventional axle. Where conventional rollers are assembled from numerous parts, usually metal, to produce a hollow roller, the conveyer roller of the present invention departs by being constructed as a monolithic unit from a polymeric material.

The invention as disclosed in this application is a polymeric roller that is formed from a single piece of a polymer that replaces a conventional metallic roller. In the simplest form, the roller is a polymeric roller that can be used to replace a conventional roller by simply removing the axle that supports the conventional roller, removing the conventional roller and replacing the conventional roller with the new polymeric roller of the proper size and replacing the axle to retain the new roller.

It is an advantage of the invention to provide a monolithic roller for use in a conveyer or aircraft storage bay.

It is another advantage of the invention is to provide a lightweight roller for use in a conveyer or aircraft storage bay.

It is another advantage of the invention is to provide a dent resistant roller for use in a conveyer or aircraft storage bay.

It is a further advantage of the invention is to provide simple self lubricating roller that does not require bearings or lubricants for use in a conveyer or aircraft cargo bay.

The invention is needed is a one piece roller, that includes a mechanism for viewing the structure of the roller for defects and need for repair. Further, the roller provides support to the housing and the housing is formed of a resilient material for long life with minimal wear. Additional desired features include corrosion resistance, low weight, and ease of cleaning

DETAILED DESCRIPTION

Figure 1:
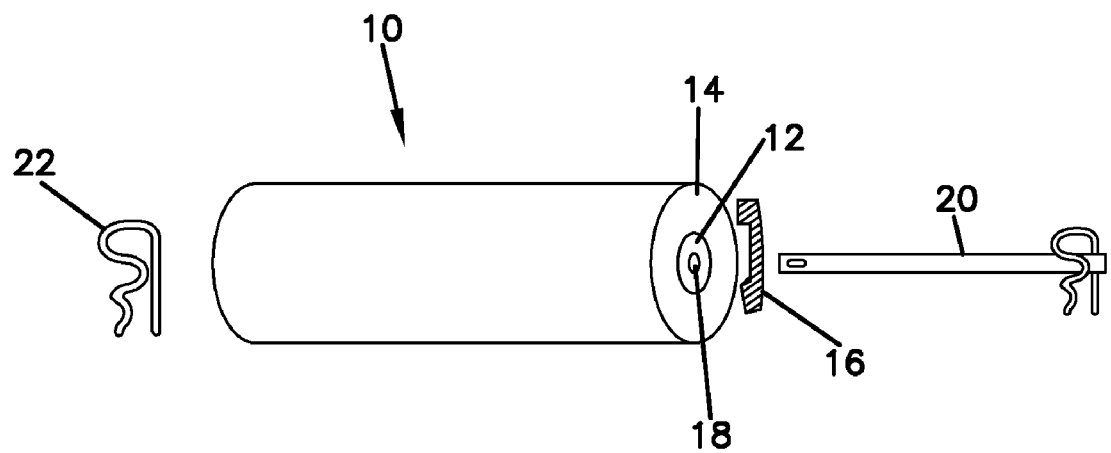
FIG. 1 depicts an example of one embodiment of the invention.
Figure 2:
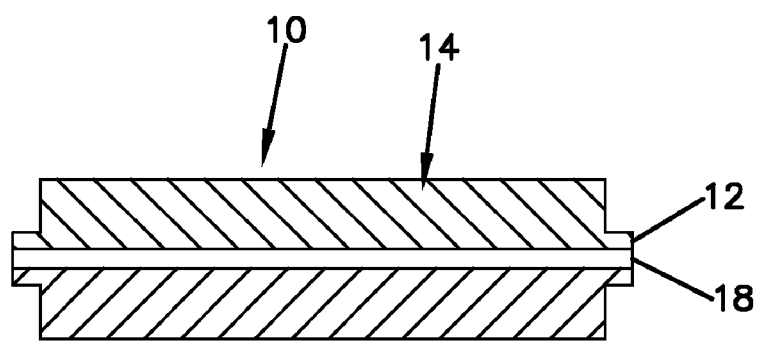
FIG. 2 depicts a cross-sectional view along the longitudinal axis of the roller shown in FIG. 1.

Referring to the drawings, shown in FIG. 1 is a roller 10. The roller is approximately between ½ inch and 25 feet in length and ¼ inch and 12 inches in diameter, more preferably is between 3 inches and 4 inches in length and ½ inches and 6 inches in diameter and for aircraft conveyors most preferably is approximately 3¼ inches in length and 1 inch in diameter. The bushing 12 typically found in rollers are integral with the outer housing 14 and may be integral with the end caps 16. The bushing 12 preferably extend the entire length of the housing 14 as shown. Co-axially extending through the bushing 12 is a centrally disposed aperture 18 sized to rotatably receive an axle 20 therethrough. The axle 20 being securable to roller rack 42 either directly or indirectly, thereby joining the rollers 10 to the conveyor assembly.

The actual size of a roller 10 is dictated by the application. During manufacturer, a roller 10 will be constructed of a specific length and diameter to fit a specific application.

It has been found that various readily available polymers are suitable for fabrication into rollers 10. Suitable polymers would include polysulfone, nylon, polycarbonate, polyetherimide, polyetherketone, polyphenylene sulfide and polyvinylidene fluoride and acetyl copolymers are preferred. Acetyl copolymers are readily available under the trademarks of Celcon®, Acetron®, and other trademarks from various vendors.

The acetyl copolymers have been subjected to a burn test and have passed. The burn test requires that the roller 10 have a burn rate of less than 4.0 inches per minute and the test samples have shown a burn rate of 0.6 inches per minute.

While the acetyl copolymers rollers 10 do not have the tested strength of prior art metal rollers, the strength is sufficient for the intended uses. Notably too, was that unlike the metal rollers, the acetyl copolymers rollers 10 did not dent or deform during the testing. When the acetyl copolymers rollers 10 failed the failure was obvious allowing easy detection and replacement.

Manufacturing may be made simple by machining an elongate piece of round stock to a suitable diameter, boring the stock, cutting to length and detailing the ends to suit. Surprisingly, it is efficient to machine rollers 10 from readily available round stock. The machining may be automated on any of a number of CNC machines such as the Hardinge Super Slant and others.

The bushing 12 may be formed from any suitable material having the required properties of allowing rotation about the axle 20 and longevity of use while not spalling bushing particles into the environment. Suitable bushing materials include various polymers such as Nylon®, Delrin®, and acetyl copolymers; or various alloys of brass and bronze, including Oilite®.

This construction is preferably done with polymers having suitable physical characteristics for the environment in which the rollers 10 are to operate. Of the voluminous polymers available, some suitable polymers include polysulfone, polyetherimide, polyetherketone, polyphenylene sulfide and polyvinylidene fluoride. Other polymers may also work.

The polymer should have a compressibility strength sufficient to allow the roller 10 and aperture 18 to remain generally round as cargo passes over the conveyor. Should the roller 10 or aperture 18 become overly distorted the rollers 10 will not rotate and impede the movement of product or cargo along the conveyor. It has been found that a compressibility strength of 20 psi or greater is suitable for aircraft conveyor systems. Desirably, the compressibility strength will be 200 psi or greater when the roller is used in aircraft conveyors. The compressibility strength causes the roller to either lose or retain shape as weight bears of the roller.

Figure 3:
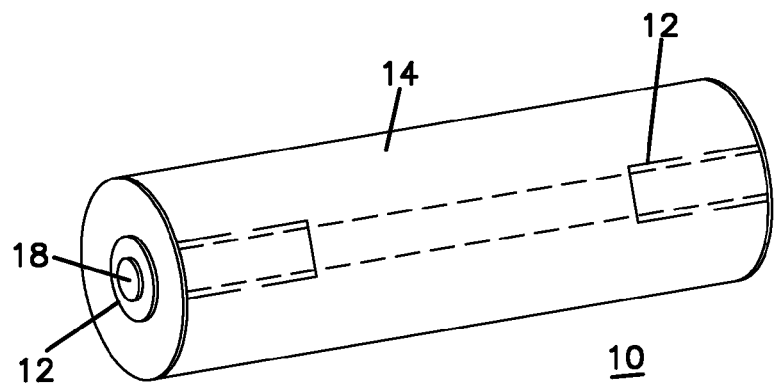
FIG. 3 depicts another example of an embodiment of the invention.
Figure 4:
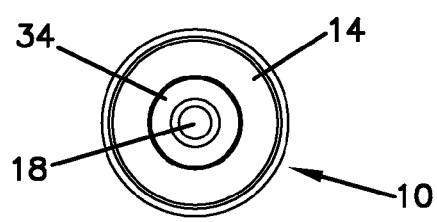
FIG. 4 depicts a view of one of the ends of an exemplary roller of an embodiment of the invention.
Figure 5:
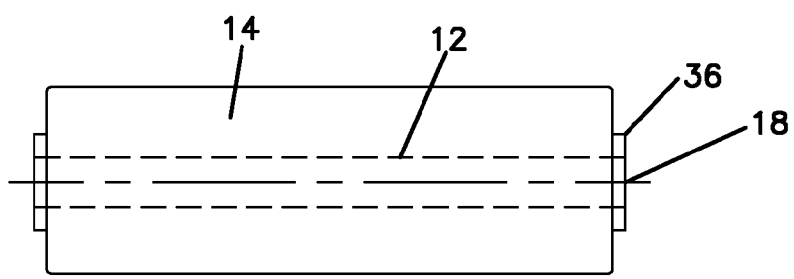
FIG. 5 depicts still another example of an embodiment of the invention.
Figure 6:
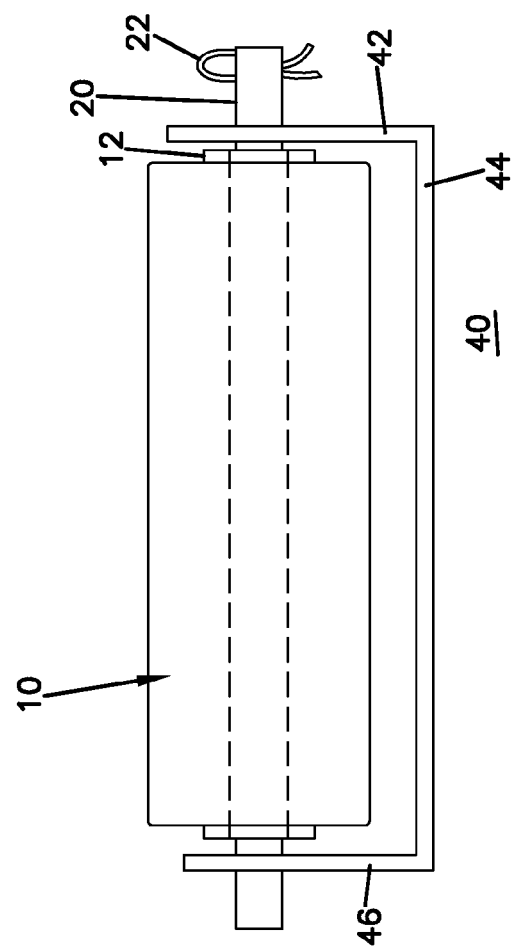
FIG. 6 depicts an exemplary roller of the invention on an exemplary roller rack.

In a second embodiment of the invention, the bushing 12 may not extend the entire length of the roller 10, but, as shown in FIG. 3, extends only partially into the central aperture 18 and provides the bearing surface proximate the ends of the roller 10 to receive the axle 20. Typically, a shoulder 36 is formed on each end of the roller 10 in this embodiment. The shoulder 36 provides a small space between the outer periphery of the roller and the ends 46 of the roller rack 41 to minimize the possibilities of materials catching therebetween and fouling the roller 10.

In this embodiment, it has been found that sufficient bearing area is provided and the removal of the central part of the bearing does not adversely effect the longevity of the roller 10.

In a third embodiment, where heavy loads or use of the roller 10 is expected the end of the roller 10 is bored to accept a bearing 34. The bearing 34 may be any of the numerous types of readily available bearings, such as a ball bearing, roller bearing, needle bearing, or the like. Bearings 34 of this type are well known in the art and readily available from numerous sources. Although it is not required, the bearing 34 may be a sealed bearing. The bearing 34 is set into the end of the roller 10 leaving the bearing extending slightly out from the end of the roller 10 so that the bearing may perform the same function as the shoulder 36 of the second embodiment.

In fourth embodiment of the invention the bushing 12 is integrated into the outer housing 14 and is not a separate entity. Here the polymeric material of the outer housing 14 bears directly on the axle 20 to provide the bearing surface.

The lubricity is helpful to allow turning of the roller 10 on the axle 20. The lubricity may be controlled by the selection of a polymer. Should the polymer not have natural lubricity, lubricity may be added via a lubricant compatible with the chosen polymer. Lubricity may also be chosen to prevent product or cargo atop the conveyor from moving too quickly or slowly.

Loosely related to the compressibility strength is brittleness. Rollers 10 commonly receive sudden shock loads or other jarring force. In these situations, it is important that the roller 10 does not chip or otherwise deform. Accordingly, the inventor has found that an impact strength needs to remain at or above 0.5 (foot lbs.)/inch. Desirably the impact strength will be 1.0 ft. lbs./inch or greater. It has been found that workers using conveyors use pry bars and other similarly shaped tools prying against the rollers to dislodge stuck product, making impact strength important to guard against sudden shock loads that may occur in such instances.

The polymer should further be resilient sufficiently to return to its original shape after the cargo passes over the roller 10. Typically, the rollers 10 are used millions of times over the life span of the roller 10. Prior rollers commonly wear by becoming misshaped over the life of the product. Accordingly, the inventor has discovered the roller 10 should have a flexural strength of 20 psi or greater. A higher flexural strength adds life to the roller by providing a lower tendency to deform and a higher tendency to return to its original shape.

The strengths in terms of compressibility, impact strength and flexural strength are provided assuming the roller is the preferred roller and is being used on an aircraft conveyor for cargo. Other sized rollers and alternate uses may alter the strengths needed.

In its use, a roller 10 the correct size is selected for installation into an application. Typically a group of rollers is installed as a unit called a roller tray. A roller tray consists of a multiplicity of roller assemblies 40. The selected roller 10 is taken to the roller assembly for installation. The existing roller is first removed by removing the retaining pin 22 and sliding the axle 20 from the roller rack 42 freeing the old roller. A new roller 10 is placed between the ends 46 of the roller rack and above the base 44 of the roller rack. The axle 20 is then passed through an end 46 of the roller rack and through the central aperture 18 or the roller 10 and thence through the second end 46 of the roller rack 42. The retaining pin 22 is then replaced and the roller 10 has been installed.

After installation, a roller 10 functions as the previous convention roller had functioned. Product is rolled over the roller 10 and perhaps, stored on the roller 10. A user may move the product over the rollers 10 and secure the product in a suitable location. When necessary the product may be forcibly moved either by the user or through the use of tools such as pry bars.

Periodically, the roller 10 may be inspected visually. As the roller 10 is translucent or transparent, a quick simple visual inspection will detect any damage to the roller 10 obviating the need for an inspector to crawl around on the rollers inspecting to discover damage to conventional rollers.

Although the present invention has been described with reference to preferred embodiments, workers skilled in the art will recognize changes may be made in form and detail without departing from the spirit and scope of the invention.

We claim:

1. An aircraft roller system comprising:
   an aircraft including an aircraft cargo storage bay; and
   a roller mounted within the aircraft cargo storage bay, the roller configured for loading, unloading, and placement of cargo packages within the aircraft and for supporting the cargo packages during flight of the aircraft, the roller including a one-piece integral body having a cylindrical shape, the entirety of the body being made solely out of a single piece of polymeric material, said body having a length extending from a first outermost end to a second outermost end and a diameter, the first outermost end of the body defined by a first outwardly protruding portion that protrudes longitudinally from a first intermediate end to the first outermost end thereby defining a first exterior shoulder between the first outermost end and the first intermediate end, the second outermost end of the body defined by a second outwardly protruding portion that protrudes longitudinally from a second intermediate end to the second outermost end thereby defining a second exterior shoulder between the second outermost end and the second intermediate end, said body including an aperture extending longitudinally along and through the center of said body from the first outermost end to the second outermost end, the aperture sized to rotatably receive an axle therethrough, the axle being for mounting the roller within the aircraft cargo storage bay, wherein the roller has a burn rate of less than 4.0 inches per minute.

2. The aircraft system of claim 1, wherein the polymeric material is selected from the group consisting of polysulfone, nylon, polycarbonate, polyetherimide, polyetherketone, polyphenylene sulfide, polyvinylidene fluoride and acetyl copolymer.

3. The aircraft system of claim 1, wherein the polymeric material is acetyl copolymer.

4. The aircraft system of claim 1, wherein the roller has an impact strength of at least 0.5 ft. lbs./in.

5. The aircraft system of claim 1, wherein the roller has a flexural strength of at least 20 psi.

6. The aircraft system of claim 1, wherein the roller has a compressibility strength of at least 20 psi.

7. The aircraft system of claim 1, wherein the roller has a compressibility strength of at least 200 psi.

8. The aircraft system of claim 1, wherein the diameter of the body of the roller is between ¼ of an inch to 12 inches.

9. The aircraft system of claim 1, wherein the length of the body of the roller is between ½ of an inch to 25 feet.

10. The aircraft system of claim 1, wherein the diameter of the body of the roller is between ½ of an inch to 6 inches.

11. The aircraft system of claim 1, wherein the length of the body of the roller is between 3 inches to 4 inches.

* * * * *

UNITED STATES PATENT AND TRADEMARK OFFICE
CERTIFICATE OF CORRECTION

PATENT NO. : 7,771,333 B2  
APPLICATION NO. : 10/068243  
DATED : August 10, 2010  
INVENTOR(S) : Spiess et al.

Page 1 of 1

It is certified that error appears in the above-identified patent and that said Letters Patent is hereby corrected as shown below:

Col. 3, lines 17-18: "and acetyl copolymers are preferred. Acetyl copolymers are" should read --and acetal copolymers are preferred. Acetal copolymers are--

Col. 3, line 21: "The acetyl copolymers have" should read --The acetal copolymers have--

Col. 3, line 25: "the acetyl copolymers rollers" should read --the acetal copolymers rollers--

Col. 3, line 28: "the acetyl copolymers rollers" should read --the acetal copolymers rollers--

Col. 3, line 29: "the acetyl copolymers" should read --the acetal copolymers--

Col. 3, line 44: "acetyl copolymers;" should read --acetal copolymers;--

Col. 6, lines 15-16, claim 2: "and acetyl copolymer." should read --and acetal copolymer.--

Col. 6, line 18, claim 3: "is acetyl copolymer." should read --is acetal copolymer.--

Signed and Sealed this  
Twenty-fourth Day of April, 2012

David J. Kappos  
*Director of the United States Patent and Trademark Office*